United States Patent
Darnell et al.

(10) Patent No.: US 6,180,748 B1
(45) Date of Patent: Jan. 30, 2001

(54) PROCESS FOR DEACTIVATING ALKALI METAL CATALYST RESIDUES IN POLY(2,2,4,4-TETRAMETHYL-1,3-CYCLOBUTYLENE CARBONATE RESIDUES

(75) Inventors: William R. Darnell, Weber City, VA (US); Theodore R. Walker; Jean C. Fleischer, both of Kingsport, TN (US)

(73) Assignee: Eastman Chemical Company, Kingsport, TN (US)

( * ) Notice: Under 35 U.S.C. 154(b), the term of this patent shall be extended for 0 days.

(21) Appl. No.: 08/996,661

(22) Filed: Dec. 23, 1997

Related U.S. Application Data

(60) Provisional application No. 60/034,163, filed on Dec. 28, 1996.

(51) Int. Cl.[7] .................................................. C08G 64/00
(52) U.S. Cl. ............................................................ 528/196
(58) Field of Search ............................................. 528/196

(56) References Cited

U.S. PATENT DOCUMENTS

| | | | |
|---|---|---|---|
| 2,210,817 | 8/1940 | Peterson | 528/196 |
| 2,787,632 | 4/1957 | Stevens | 528/196 |
| 2,789,968 | 4/1957 | Reynolds et al. | 528/196 |
| 3,022,272 | 2/1962 | Schnell et al. | 528/196 |
| 3,030,335 | 4/1962 | Goldberg | 528/196 |
| 3,313,777 | 4/1967 | Elam et al. | 528/196 |
| 3,317,466 | 5/1967 | Caldwell et al. | 528/196 |
| 3,335,111 | 8/1967 | Pray et al. | 528/196 |
| 3,404,122 | 10/1968 | Fritz et al. | 528/196 |
| 3,433,756 | 6/1976 | Seeliger | 528/176 |
| 3,772,405 | 11/1973 | Hamb | 528/196 |
| 3,951,903 | 4/1976 | Shaffer | 528/196 |
| 4,182,726 | 1/1980 | Illuminati et al. | 528/196 |
| 4,263,364 | 4/1981 | Seymour et al. | 528/196 |
| 4,350,805 | 9/1982 | Jackson, Jr. et al. | 528/196 |
| 4,585,854 | 4/1986 | Tung et al. | 528/295 |
| 5,171,830 | 12/1992 | Grey | 528/371 |
| 5,194,523 | 3/1993 | Small, Jr. et al. | 525/439 |
| 5,207,967 | 5/1993 | Small, Jr. et al. | 264/328.16 |
| 5,502,119 | 3/1996 | Hamilton | 525/439 |
| 5,668,802 | 9/1997 | Hirata et al. | 524/154 |

FOREIGN PATENT DOCUMENTS

| | | |
|---|---|---|
| 14 95 379 | 6/1969 | (DE) . |
| 0 435 124 A2 | 7/1991 | (EP) . |
| 0 460 646 A2 | 12/1991 | (EP) . |
| 0 534 189 | 3/1993 | (EP) . |
| 0 738 579 | 10/1996 | (EP) . |
| 0 738 579 A2 | 10/1996 | (EP) . |
| 2v349v612 | 11/1977 | (FR) . |
| 63-92644 | 4/1988 | (JP) . |
| 64-1724 | 1/1989 | (JP) . |

OTHER PUBLICATIONS

Caldwell et al., Defensive Publication T858,012, 858 O.G. 43, Jan. 7, 1969.
Gilkey et al., Defense Publication T873,016, 873 O.G. 1033, Apr. 28, 1970.
Coover et al., Defensive Publication T875,010, 875 O.G. 342, Jun. 9, 1970.
Haggin, "Catalytic Cosynthesis Method Developed," Chemical and Engineering News, pp. 25–26, May 4, 1992.
Gawlak et al., "Polycarbonates from the 2,2,4,4,–Tetramethylcyclobutane–1,3–Diols," Chemistry And Industry, pp. 1148–1149, Jun. 23, 1962.

(List continued on next page.)

*Primary Examiner*—Terressa Mosley
(74) *Attorney, Agent, or Firm*—Betty J. Boshears; Harry J. Gwinnell

(57) ABSTRACT

The invention relates to a process of deactivating a polycarbonate, by mixing a polycarbonate having an active alkali metal catalyst residue therein with a deactivator represented of a formula of:

(Ia)

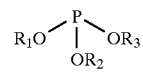

(Ib)

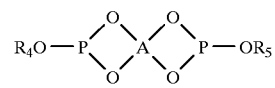

(Ic)

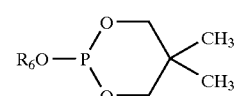

(II)

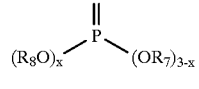

(IIIa) an
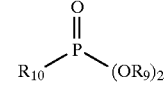

(IV)

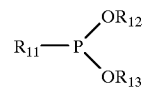

wherein, $R_1$–$R_7$ and $R_9$ are, independently, hydrogen; aliphatic hydrocarbon of from 1 to 20 carbon atoms; substituted aromatic hydrocarbon of from 6 to 20 carbon atoms; or unsubstituted aromatic hydrocarbon of from 6 to 20 carbon atoms; $R_8$ and $R_{10}$–$R_{13}$ are, independently, substituted or unsubstituted aromatic hydrocarbon of from 6 to 20 carbon atoms; or aliphatic hydrocarbon of from 1 to 20 carbon atoms; A is a tetrafunctional hydrocarbon group; and x is an integer of from 1 to 3, at a temperature and time sufficient to deactivate the alkali metal catalyst to form a deactivated polycarbonate, wherein the deactivated catalyst is not removed from the deactivated polycarbonate. The invention also relates to a polycarbonate having a deactivated metal catalyst.

37 Claims, No Drawings

OTHER PUBLICATIONS

Schnell "Chemistry And Physics of Polycarbonates, Polymer Reviews," vol. 9, Interscience Publishers (Germany), pp. 9–24, 1964.

Database WPI, Section Ch, Week 9308, Class A23, AN 93–061697 (citing JP 05 009286A, Jan 19, 1993).

Database WPI, Section Ch, Week 9209, Class A23, AN 92–069933 (citing JP 04 015223 A, Jan. 20, 1992).

Database WPI, Section Ch, Week 9207, Class A23, AN 92–053979 (citing JP 04 001229 A, Jan. 6, 1992).

Chemical Abstracts, vol. 114, No. 4, Jan. 28, 1991, abstract no. 25305 (citing JP 02 180954 A Jul. 13 1990).

Patent Abstracts of Japan, vol. 010, No. 350 (C–387), Nov. 26, 1986 (citing JP 61 151263 A), Jul. 9, 1986).

US Defensive Publication T873016, Gilkey et al., Apr. 28, 1970.

Database WPI, Section CH, AN 95–261358 Week 9534, citing JP 07 165903 Jun. 27, 1995.

Chemical Abstracts, AN 109: 171789, vol. No. 20, Apr. 23, 1998, (abstract no. 171789), citing JP 63 092644, Apr. 23, 1988.

PROCESS FOR DEACTIVATING ALKALI METAL CATALYST RESIDUES IN POLY(2,2,4,4-TETRAMETHYL-1,3-CYCLOBUTYLENE CARBONATE RESIDUES

CROSS REFERENCE TO RELATED APPLICATIONS

This application claims priority upon U.S. provisional application serial No. 60/034,163, filed Dec. 28, 1996; the contents of which are herein incorporated by this reference in their entirety.

FIELD OF THE INVENTION

The invention relates to a process for deactivating a polymerization catalyst used for the preparation of polycarbonates.

BACKGROUND

Poly(2,2,4,4-tetramethyl-1,3-cyclobutylene carbonate), the polycarbonate of 2,2,4,4-tetramethyl-1,3-cyclobutanediol, has been formed by melt polymerization processes employing basic alkali metal catalysts. But the polycarbonate is somewhat thermally unstable due to the presence of basic alkali metal catalyst residue.

Various methods of adding acidic material to destroy the basic catalyst residues which remain in polycarbonates and cause instability have been reported in the literature. For example, U.S. Pat. No. 3,022,272 discloses that materials such as aromatic sulfonic acid, organic acid halides and chlorocarbonates, dialkyl sulfates, and acid salts of inorganic acids such as ammonium sulfate are useful "catalyst killers."

The acidic materials that have been used for this purpose have practical disadvantages. The aromatic sulfonic acids, acid halides and, to a lesser extent, the acid salts of inorganic acids, are corrosive and some, particularly the strong acids such as toluenesulfonic acid, have been found to produce undesirable color in the finished product. The dialkyl sulfates, while not so corrosive, are known to be both toxic and possibly carcinogenic, and the presence of traces of them in the final product would present a problem for the consumer, especially if the plastic was used in food or cosmetic containers.

Another problem with many known deactivation methods is that the catalyst is not completely deactivated. Evidence of remaining active catalyst is shown in U.S. Pat. No. 3,022,272 which discloses that, after deactivation of the catalysts, the interesterification can be further continued to a limited extent in order to further increase the molecular weight of the polymer.

U.S. Pat. No. 2,210,617 discloses a process for preparing a polycarbonate in the presence of an alkali metal catalyst. After polymerization, the excess alkali metal is removed by washing with a strong acid such as hydrochloric acid. The polymerization is then completed by further heating under vacuum.

U.S. Defensive Publication T873,016 discloses removal of basic alkali metal catalyst residues from poly(2,2,4,4-tetramethyl-1,3-cyclobutylene carbonate) in the solid state or in solution. The process therein is conducted by contacting the polymer with an acidic organic compound having solvent power and an ionization constant of about $2 \times 10^{-1}$ to $2.5 \times 10^{-6}$, followed by extraction either with the acid, or by dissolving the polymer in a water-immiscible solvent and extracting the solution with water.

In light of the above, it is highly desirable to provide a process for increasing the thermal stability of poly(2,2,4,4-tetramethyl-1,3-cyclobutylene carbonate) containing active alkali metal catalysts by completely deactivating the catalyst residue contained in the polymer. It would be especially desirable to provide a catalyst deactivation method which does not require the use of strongly acidic, corrosive, or volatile materials, nor washing or extraction of the catalyst from the polymer.

SUMMARY OF THE INVENTION

In accordance with the purpose(s) of this invention, as embodied and broadly described herein, this invention, in one aspect, relates to a process of deactivating a polycarbonate, comprising admixing the polycarbonate containing an active alkali metal catalyst residue with an effective amount of a deactivator represented by a formula selected from the group consisting of:

(Ia)

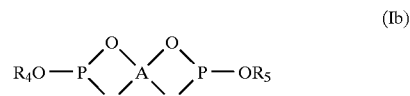

(Ib)

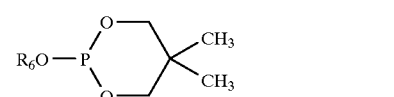

(Ic)

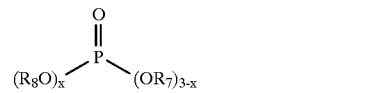

(II)

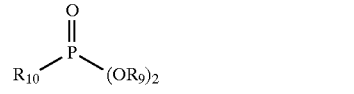

(IIIa) an

(IV)

wherein,
$R_1$–$R_7$ and $R_9$ are, independently, hydrogen; aliphatic hydrocarbon of from 1 to 20 carbon atoms; substituted aromatic hydrocarbon of from 6 to 20 carbon atoms; or unsubstituted aromatic hydrocarbon of from 6 to 20 carbon atoms;

$R_8$ and $R_{10}$–$R_{13}$ are, independently, substituted or unsubstituted aromatic hydrocarbon of from 6 to 20 carbon atoms; or aliphatic hydrocarbon of from 1 to 20 carbon atoms;

A is a tetrafunctional hydrocarbon group; and x is an integer of from 1 to 3, at a temperature and time sufficient to deactivate the alkali metal catalyst to form a deactivated polycarbonate, wherein the deactivated catalyst is not removed from the deactivated polycarbonate.

The invention further relates to a process of deactivating a polycarbonate, comprising admixing the polycarbonate containing an active alkali metal catalyst residue with a phosphorous compound at a temperature and time sufficient to deactivate the alkali metal catalyst to form a deactivated polycarbonate, wherein the deactivated catalyst is not removed from the deactivated polycarbonate.

The invention further relates to a process of deactivating a polycarbonate, comprising:
(a) admixing
  i) a solid state polycarbonate comprising an active alkali metal catalyst; and
  ii) a deactivator having the formula (Ia), (Ib), (Ic), (II), or (IIIa); and
(b) heating the admixture of step (a) at a temperature sufficient to melt the admixture and deactivate the alkali metal catalyst to produce a deactivated polycarbonate, wherein the deactivated catalyst is not removed from the deactivated polycarbonate.

The invention further relates to a process of making a deactivated polycarbonate, comprising:
(a) polymerizing a first polycarbonate in the presence of an alkali metal catalyst to produce an activated polycarbonate; and
(b) admixing the activated polycarbonate with an effective amount of a deactivator represented by a formula selected from the group consisting of:

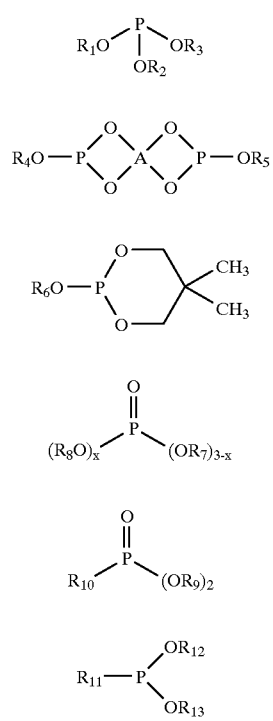

wherein,
$R_1$–$R_7$ and $R_8$ are, independently, hydrogen; aliphatic hydrocarbon of from 1 to 20 carbon atoms; substituted aromatic hydrocarbon of from 6 to 20 carbon atoms; or unsubstituted aromatic hydrocarbon of from 6 to 20 carbon atoms;
$R_8$ and $R_{10}$–$R_{13}$ are, independently, substituted or unsubstituted aromatic hydrocarbon of from 6 to 20 carbon atoms; or aliphatic hydrocarbon of from 1 to 20 carbon atoms;
A is a tetrafunctional hydrocarbon group; and
x is an integer of from 1 to 3, at a temperature and time sufficient to deactivate the alkali metal catalyst to form a deactivated polycarbonate, wherein the deactivated catalyst is not removed from the deactivated polycarbonate.

The invention further relates to a polycarbonate produced by the processes described above.

The invention further relates to a polycarbonate comprising a deactivated alkali metal catalyst, wherein the deactivated metal catalyst is a salt produced by the reaction between a deactivator and an alkali metal catalyst.

The invention further relates to a process of deactivating poly(2,2,4,4-tetramethyl-1,3-cyclobutylene carbonate) comprising reacting poly(2,2,4,4-tetramethyl-1,3-cyclobutylene carbonate) containing active alkali metal catalyst residue with an effective amount of a deactivator represented by a formula selected from the group consisting of:

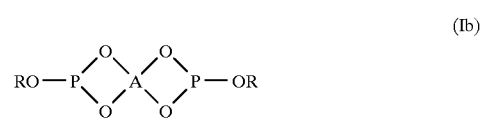

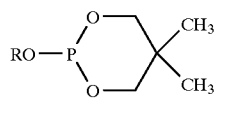 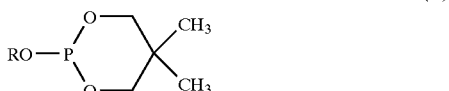

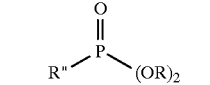 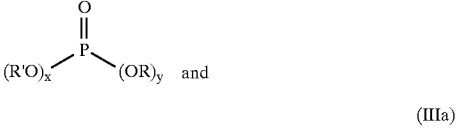

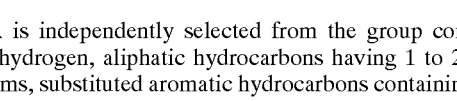

wherein R is independently selected from the group consisting of hydrogen, aliphatic hydrocarbons having 1 to 20 carbon atoms, substituted aromatic hydrocarbons containing 6 to 20 carbon atoms, unsubstituted aromatic hydrocarbons containing 6 to 20 carbon atoms, and mixtures thereof; R' is selected from the group consisting of substituted aromatic hydrocarbons containing 6 to 20 carbon atoms, and unsubstituted aromatic hydrocarbons containing 6 to 20 carbon atoms;
R" is independently selected from the group consisting of hydrogen, substituted aromatic hydrocarbons containing 6 to 20 carbon atoms, and unsubstituted aromatic hydrocarbons containing 6 to 20 carbon atoms;
A is a tetrafunctional hydrocarbon group;
x is 1 to 3; and
y is the sum of (3−x)
at a temperature and time sufficient to form a deactivated polycarbonate.

Additional advantages of the invention will be set forth in part in the description which follows, and in part will be obvious from the description, or may be learned by practice of the invention. The advantages of the invention will be realized and attained by means of the elements and combi-

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

In accordance with the purpose(s) of this invention, as embodied and broadly described herein, this invention, in one aspect, relates to a process of deactivating a polycarbonate, comprising admixing the polycarbonate containing an active alkali metal catalyst residue with an effective amount of a deactivator represented by a formula selected from the group consisting of:

$$R_1O-P(OR_2)-OR_3 \quad \text{(Ia)}$$

$$R_4O-P(O_2AO_2)P-OR_5 \quad \text{(Ib)}$$

$$R_6O-P(O-)(O-)C(CH_3)(CH_3) \quad \text{(Ic)}$$

$$(R_8O)_x-P(=O)-(OR_7)_{3-x} \quad \text{(II)}$$

$$R_{10}-P(=O)-(OR_9)_2 \quad \text{(IIIa) an}$$

$$R_{11}-P(OR_{12})(OR_{13}) \quad \text{(IV)}$$

wherein, $R_1-R_7$ and $R_9$ are, independently, hydrogen; aliphatic hydrocarbon of from 1 to 20 carbon atoms; substituted aromatic hydrocarbon of from 6 to 20 carbon atoms; or unsubstituted aromatic hydrocarbon of from 6 to 20 carbon atoms;

$R_8$ and $R_{10}-R_{13}$ are, independently, substituted or unsubstituted aromatic hydrocarbon of from 6 to 20 carbon atoms; or aliphatic hydrocarbon of from 1 to 20 carbon atoms;

A is a tetrafunctional hydrocarbon group; and x is an integer of from 1 to 3, at a temperature and time sufficient to deactivate the alkali metal catalyst to form a deactivated polycarbonate, wherein the deactivated catalyst is not removed from the deactivated polycarbonate.

The invention further relates to a process of deactivating poly(2,2,4,4-tetramethyl-1,3-cyclobutylene carbonate) comprising reacting poly(2,2,4,4-tetramethyl-1,3-cyclobutylene carbonate) containing active alkali metal catalyst residue with an effective amount of a deactivator represented by a formula selected from the group consisting of:

$$RO-P(OR)-OR \quad \text{(Ia)}$$

$$RO-P(O_2AO_2)P-OR \quad \text{(Ib)}$$

$$RO-P(O-)(O-)C(CH_3)(CH_3) \quad \text{(Ic)}$$

$$(R'O)_x-P(=O)-(OR)_y \quad \text{and} \quad \text{(II)}$$

$$R''-P(=O)-(OR)_2 \quad \text{(IIIa)}$$

wherein R is independently selected from the group consisting of hydrogen, aliphatic hydrocarbons having 1 to 20 carbon atoms, substituted aromatic hydrocarbons containing 6 to 20 carbon atoms, unsubstituted aromatic hydrocarbons containing 6 to 20 carbon atoms, and mixtures thereof; R' is selected from the group consisting of substituted aromatic hydrocarbons containing 6 to 20 carbon atoms, and unsubstituted aromatic hydrocarbons containing 6 to 20 carbon atoms;

R" is independently selected from the group consisting of hydrogen, substituted aromatic hydrocarbons containing 6 to 20 carbon atoms, and unsubstituted aromatic hydrocarbons containing 6 to 20 carbon atoms;

A is a tetrafunctional hydrocarbon group;

x is 1 to 3; and y is the sum of (3–x)

at a temperature and time sufficient to form a deactivated polycarbonate.

The invention further relates to a process of deactivating a polycarbonate, comprising admixing the polycarbonate containing an active alkali metal catalyst residue with a phosphorous compound at a temperature and time sufficient to deactivate the alkali metal catalyst to form a deactivated polycarbonate, wherein the deactivated catalyst is not removed from the deactivated polycarbonate.

The applicants unexpectedly discovered a process by which particular phosphorus-containing compounds can be used to completely deactivate basic alkali metal catalyst residues contained in poly(2,2,4,4-tetramethyl-1,3-cyclobutylene carbonate), therefore substantially increasing the thermal stability of the polymer.

The effectiveness of the present deactivation process on poly(2,2,4,4-tetramethyl-1,3-cyclobutylene carbonate) was particularly surprising since thermal stabilization of aliphatic polycarbonates by the addition of an acidic material is not generally useful or expected.

The process of the present invention has the further unexpected benefit of not requiring removal of the deactivated catalyst from the polymer. This is particularly surprising in light of U.S. Defensive Publication T873,016 in which acid phosphates (acidic esters of phosphoric acid) and acid phosphites (acidic esters of phosphorous acid) are listed as two of several types of acids which react with alkali metal catalyst residue to form salt impurities in poly(2,2,4,4-tetramethyl-1,3-cyclobutylene carbonate). The Defensive Publication teaches that the salts formed are colored impurities which must be removed from the polycarbonate in order to provide a polycarbonate product having improved thermal stability and good color.

The applicants have found the retention of the catalysts deactivated by the particular phosphorus compounds of the present process has no deleterious effect on polymer color. It has also been found that the improvement in polymer thermal stability is surprisingly good when the deactivated catalyst is retained in the polymer matrix. Therefore, the use of the particular phosphorus compounds of the present invention as deactivators provides a much faster, yet unexpectedly effective, deactivation process.

In light of the literature disclosing other methods of deactivating alkali metal catalysts in polycarbonates as being acid/base neutralizations, it was particularly surprising to find that the present process is very effective when the phosphorus compound is a non-acidic derivative of phosphorous acid.

An additional unexpected benefit of the present process is that it can be conducted under molten conditions. This allows for very convenient deactivation immediately after melt polymerization. This is surprising in view of U.S. Defensive Publication T873,016 which teaches against deactivation of alkali metal catalysts under molten conditions due to the formation of colored decomposition impurities.

The process of the present invention comprises treating a polycarbonate containing active alkali metal catalyst residues with an effective amount of a phosphorus-containing deactivator to form a deactivated polycarbonate. The term "active" is used herein to describe a catalyst residue which is capable of promoting further polymerization. A "deactivated" catalyst will not promote polymerization.

In one embodiment, poly(2,2,4,4-tetramethyl-1,3-cyclobutylene carbonate) is treated with the present deactivation process after the polymerization process has proceeded to the desired molecular weight. Since the alkali metal catalyst is completely deactivated by the present process, no further buildup of molecular weight will occur under high vacuum, as occurs in many of the known deactivation methods.

This process is effective in deactivating ionized basic metal residues of alkali metal condensation catalysts known in the polycarbonate art. Suitable alkali metal catalysts include, but are not limited to, oxides, hydrides and hydroxides of alkali metals, free alkali metals, butyl lithium, phenyl lithium, sodium aluminate, and alkali metal alkoxides such as sodium methoxide. The present process is preferably used to deactivate sodium methoxide, lithium methoxide, sodium metal, and lithium metal.

The present process is useful in deactivating alkali metal residues contained in poly(2,2,4,4-tetramethyl-1,3-cyclobutylene carbonate). The polycarbonate can be made by melt polymerization or solid-state polymerization methods where alkali metal catalysts are employed. U.S. Pat. No. 3,313,777 discloses poly(2,2,4,4-tetramethyl-1,3-cyclobutylene carbonate) prepared by condensation of 2,2, 4,4-tetramethyl-1,3-cyclobutanediol and carbonic acid in the presence of alkali metal catalysts.

Applicants' provisional application (serial no. 60/034, 992) incorporated herein in its entirety, discloses the preparation of poly(2,2,4,4-tetramethyl-1,3-cyclobutylene carbonate) by the self-condensation melt polymerization reaction of carbonic acid 3-methoxycarbonyloxy-2,2,4,4-tetramethyl-cyclobutyl ester methyl ester (the bis(methyl carbonate) of 2,2,4,4-tetramethyl-1,3-cyclobutanediol) in the presence of a catalyst selected from the group consisting of alkali metals, alkoxides of alkali metals, carboxylates of alkali metals, and mixtures thereof under polycondensation conditions of temperature and pressure.

Applicants' provisional application (serial no. 60/034, 164) incorporated herein in its entirety, discloses a two-staged process for making poly(2,2,4,4-tetramethyl-1,3-cyclobutylene carbonate). The first polymerization stage comprises heating a mixture containing the diol, dimethyl carbonate, and an effective amount of a basic catalyst for a time sufficient to react a sufficient number of hydroxyl groups (at least about 75%), thereby forming an intermediate including methyl carbonate-terminated oligomers. The second stage includes reacting the intermediate under polycondensation conditions of pressure and temperature no greater than 300° C. for a time sufficient to form polycarbonate.

The catalyst deactivators useful in the present process are phosphorus-containing acids and esters including phosphorous acid and the compounds represented by the following formulas:

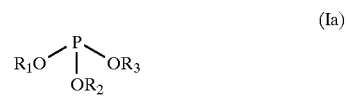

(Ia)

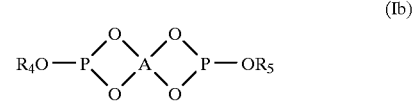

(Ib)

-continued

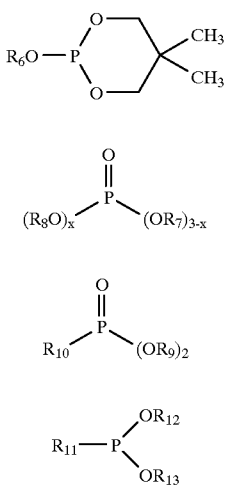

(Ic)

(II)

(IIIa) an (IV)

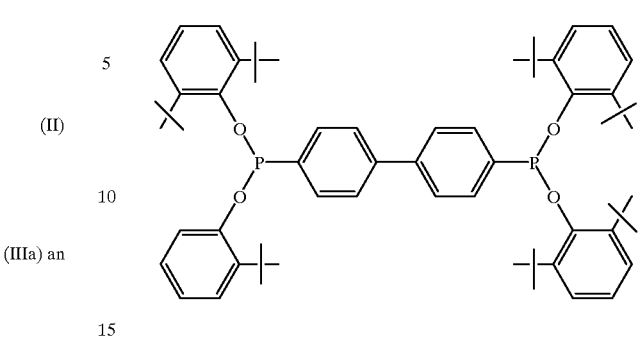

(IIIb)

wherein, $R_1$–$R_7$ and $R_9$ are, independently, hydrogen; aliphatic hydrocarbon of from 1 to 20 carbon atoms; substituted aromatic hydrocarbon of from 6 to 20 carbon atoms; or unsubstituted aromatic hydrocarbon of from 6 to 20 carbon atoms; $R_8$ and $R_{10}$–$R_{13}$ are, independently, substituted or unsubstituted aromatic hydrocarbon of from 6 to 20 carbon atoms; or aliphatic hydrocarbon of from 1 to 20 carbon atoms; A is a tetrafunctional hydrocarbon group; and x is an integer of from 1 to 3.

Suitable deactivators for use in the present process must be nonvolatile for reaction efficiency. Deactivators are considered nonvolatile for present purposes if they have vapor pressures low enough that they do not vaporize from the polymerization mixture under present processing conditions by distillation, sublimation, and the like. Volatile deactivators reverse the deactivation reaction by vaporization.

Suitable deactivators for use in the present process must also be stable under the conditions of the present process. The deactivator used should be stable enough so that it is not removed from the mixture by decomposition. Decomposition of the deactivator during the high temperature deactivation step could also lead to unwanted addition of color to the product.

In one embodiment, the deactivator is acidic. Examples of suitable catalyst deactivators represented by the formulas above include, but are not limited to, distearyl pentaerythritol diphosphite, trilauryl phosphite, di(isooctyl)phosphite, diphenyl phosphite, diphenyl phosphate, phosphorous acid, phosphoric acid, and phenyl phosphonic acid. Diphenyl phosphate is a preferred acidic deactivator.

In another embodiment, the deactivator is non-acidic. Non-acidic esters of phosphorous acid are unexpectedly useful catalyst deactivators of the present process. In one embodiment, deactivator is a trialiphatic triester of phosphorous acid or an aromatic ester of phosphorous acid. In another embodiment, the trialiphatic ester is a compound having the formula (Ia), (Ib), or (Ic), wherein, $R_1$–$R_6$ are, independently, an aliphatic hydrocarbon of from 1 to 20 carbon atoms. The preferred non-acidic deactivators are aliphatic triesters of phosphorous acid (triphosphites) represented by formulas (Ia), (Ib), and (Ic), more preferably trilauryl phosphite. Aromatic esters of phosphorous acid such as triphenyl phosphite and tris(nonylphenyl)phosphite are also useful. A useful commercially available non-acidic phosphonite is SANDOSTAB P-EPQ®, manufactured by Sandoz Chemical Company, shown below in formula IIIb.

In the process of the present invention, the active polycarbonate is treated with an effective amount of deactivator. An "effective amount" is herein defined as an amount sufficient to deactivate all basic alkali metal catalyst residues so that they no longer catalyze polymer formation or polymer buildup reactions.

The concentrations of deactivator used in the process of the present invention are expressed herein as equivalent percents, wherein the addition of 100 equivalent percent deactivator is the theoretical amount of deactivator to neutralize the amount of basic catalyst added to the polymerization reaction mixture. The concentration of active basic catalyst is necessarily theoretical due to the fact that some of the basic catalyst added to the polymerization mixture may be in a reacted form or as an unionized free metal and, therefore, unavailable for reaction with the deactivator.

For acidic deactivators, the equivalent percent is based upon the number of protic hydrogens contained therein. The amount of acidic deactivator added to the polymer may be varied within wide limits. For those deactivators which contain acidic protons, as little as about 75 equivalent percent, to as much as about 1,000 equivalent percent is an effective amount. However, more than about 500 equivalent percent of the theoretical amount required for catalyst neutralization should generally be avoided, not only for economic reasons, but because larger amounts may affect polymer properties. A preferable concentration of carboxylic acid to deactivate the polycarbonate is about 75 to 500 equivalent percent, preferably about 75 to 200 equivalent percent, more preferably about 75 to 175 equivalent percent, even more preferably about 100 to 125 equivalent percent.

For non-acidic ester deactivators (having no protic hydrogens) the required concentration of deactivator is based on the atoms of phosphorus which are contained in one mole of the deactivator. The concentration of non-acidic deactivators is represented hereinafter as a ratio of the number of phosphorus atoms per basic alkali metal atom (P/M), based on the theoretical concentration of active alkali metal atoms. The amount of non-acidic deactivator may be varied within wide limits, depending on the composition of the deactivator. A non-acidic deactivator concentration providing about 1 P/M to 10 P/M has been found useful. The concentration is preferably about 1 P/M to 5 P/M, with about 2 P/M to 4 P/M being more preferable.

A benefit of the present process is that there is no need to remove the deactivated catalyst from the polycarbonate. The term "deactivated polycarbonate" as used herein refers to the mixture of polycarbonate and deactivated catalyst.

The invention further relates to a process of making a deactivated polycarbonate, comprising:

(a) polymerizing a first polycarbonate in the presence of an alkali metal catalyst to produce an activated polycarbonate; and (b) admixing the activated polycarbonate with an effective amount of a deactivator represented by a formula selected from the group consisting of:

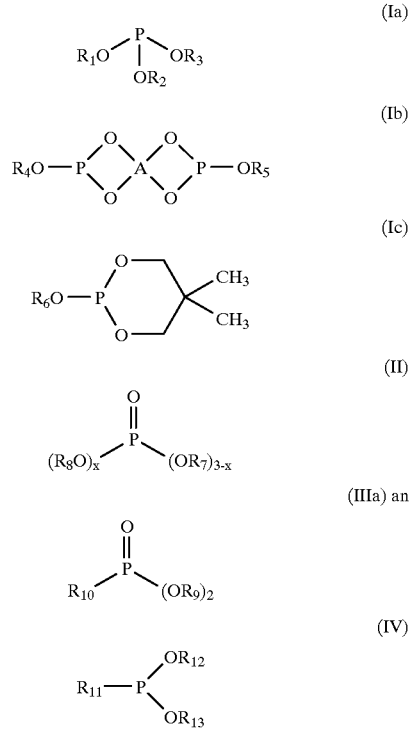

wherein,

R$_1$–R$_7$ and R$_9$ are, independently, hydrogen; aliphatic hydrocarbon of from 1 to 20 carbon atoms; substituted aromatic hydrocarbon of from 6 to 20 carbon atoms; or unsubstituted aromatic hydrocarbon of from 6 to 20 carbon atoms;

R$_8$ and R$_{10}$–R$_{13}$ are, independently, substituted or unsubstituted aromatic hydrocarbon of from 6 to 20 carbon atoms; or aliphatic hydrocarbon of from 1 to 20 carbon atoms;

A is a tetrafunctional hydrocarbon group; and x is an integer of from 1 to 3, at a temperature and time sufficient to deactivate the alkali metal catalyst to form a deactivated polycarbonate, wherein the deactivated catalyst is not removed from the deactivated polycarbonate.

The invention further relates to a process of deactivating a polycarbonate, comprising:

(a) admixing
 i) a solid state polycarbonate comprising an active alkali metal catalyst; and
 ii) a deactivator having the formula (Ia), (Ib), (Ic), (II), (IIIa) or (IV); and (b) heating the admixture of step (a) at a temperature sufficient to melt the admixture and deactivate the alkali metal catalyst to produce a deactivated polycarbonate, wherein the deactivated catalyst is not removed from the deactivated polycarbonate.

The process of the present invention is conveniently conducted under molten conditions of temperature and pressure. The process of the present invention is conducted at high temperatures from the melting point of the polymer to about 300° C., more preferably about 250 to 285° C. The process of the present invention is conducted at a pressure of from ambient atmospheric pressure to about 2.0 torr, preferably from ambient atmospheric pressure to about 1.0 torr. The present deactivation process is preferably conducted under molten conditions immediately following the melt polymerization of the polymer.

The reaction time of the process of the present invention is determined by the deactivation of all of the basic catalyst residues.

The invention further relates to a process of making a deactivated polycarbonate, comprising:

(a) polymerizing a first polycarbonate in the presence of an alkali metal catalyst to produce an activated polycarbonate; and (b) admixing the activated polycarbonate with an effective amount of a deactivator having the formula (Ia), (Ib), (Ic), (II), (IIIa) or (IV) at a temperature and time sufficient to deactivate the alkali metal catalyst and form the deactivated polycarbonate, wherein the deactivated alkali metal catalyst is not removed from the deactivated polycarbonate.

The present process is effectively combined with polymerization to provide a thermally stable polycarbonate having good color. This combined process includes 1) the step of polymerizing a polycarbonate in the presence of an alkali metal catalyst and 2) reacting the polycarbonate with an effective amount of a deactivator at a temperature and time sufficient to form a deactivated polycarbonate.

Subsequent to deactivation, the process of the present invention preferably comprises an additional step of subjecting the deactivated polycarbonate to vacuum sufficient to further increase the thermal stability of the deactivated polycarbonate.

When the polycarbonate is prepared by a melt polymerization process, a preferred method would be to release the vacuum on the polymerization melt with an inert gas, and add the desired amount of deactivator into the polymer melt. Afterwards, the mixture should be agitated under an inert atmosphere for a time sufficient to mix the nonvolatile carboxylic acid into the polymer melt. After deactivation of the catalyst residues, the thermal stability is further improved by briefly applying vacuum to the molten mixture.

In applying the process of the present invention to poly (2,2,4,4-tetramethyl-1,3-cyclobutylene carbonate) prepared by solid state polymerization, the deactivator may be physically mixed with pellets or granules of the polycarbonate. The mixture of polycarbonate and deactivator may then be extruded in order to deactivate the catalyst residues. Instead of conducting the additional low pressure step for further increasing the thermal stability, the extrusion may optionally be carried out in an extruder having high vacuum capabilities.

The invention further relates to a polycarbonate comprising a deactivated alkali metal catalyst, wherein the deactivated metal catalyst is a salt produced by the reaction between a deactivator and an alkali metal catalyst. The invention further relates to the polycarbonates produced by the processes described above.

In one embodiment, the deactivation process of the present invention provides poly(2,2,4,4-tetramethyl-1,3-cyclobutylene carbonate) having improved thermal stability. The improvement in thermal stability is shown by comparison of the degradation rate constants (DRC) of the polycarbonate before and after the process of the present invention. A reduction in DRC is an improvement in thermal stability. A detailed method of measuring DRC is shown in the Examples below.

An advantage of the present invention is that the deactivated alkali metal catalyst does not need to be removed in order to produce a polycarbonate with good clarity, color and thermal stability, which is not taught in the art. The deactivated alkali metal catalyst, which is a salt produced by the reaction between a deactivator and the catalyst, does not alter the color, clarity or thermal stability of the polycarbonate.

The polycarbonate product of the present invention will be clear with little or no color, and the clarity and color of the poly(2,2,4,4-tetramethyl-1,3-cyclobutylene carbonate) product of the present process are not significantly changed by the deactivation process of the present invention.

The preferred product of the present invention is clear, colorless poly(2,2,4,4-tetramethyl-1,3-cyclobutylene carbonate) having a degradation rate constant (DRC) of less than about $10 \times 10^{-5}$.

The following examples further illustrate the process of the present invention but are not intended to be a limitation thereof.

EXAMPLES

The following examples are put forth so as to provide those of ordinary skill in the art with a complete disclosure and description of how the compounds and methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in °C. or is at room temperature and pressure is at or near atmospheric.

The following test methods were used in the Examples:

1) inherent viscosity (IV) was determined at 25° C. using 0.25 grams polymer dissolved, without heating, in a 60/40 w/w mixture of phenol/1,1,2,2-tetrachloroethane at a concentration of 0.005 g/mL; and 2) Degradation Rate Constant (DRC) determinations were made by melt thermal stability testing using a Dynamic Analyzer RDAII mechanical spectrometer rheometer manufactured by Rheometrics, Inc. (Piscataway, N.J.), using 25 mm flat parallel plate fixtures, nitrogen purge gas, 10% strain, 1 radian/§ oscillation frequency, 1 mm sample gap (sample thickness), 275° C. melt temperature.

To test thermal stability, sample polymer pellets were dried overnight under full vacuum at 120° C. The rheometer was preheated to 275° C. test temperature. The "zero gap" between the parallel plates was set, and pellets loaded directly onto the lower plate and allowed to melt. The upper plate was then lowered to give a 1-mm sample gap. Excess melt was thereafter trimmed away. The temperature was allowed to reequilibrate and the instrument, which was previously programmed for a sweep test at constant frequency rate and temperature, was started.

Thirty readings of melt viscosity were taken at 1 minute intervals. The collected data (elastic modulus, G'; loss modulus, G"; frequency, w temperature, °C.; and time, t) were reduced by an RS1 software program (BBN Corp.) to plot melt viscosity versus time and calculate a degradation rate constant (DRC) using the equation $1/(N)^{(a)} = 1/(N_o)^{(a)} + (DRC)t$, where $N_o$=complex viscosity at zero heating time ($t_o$) ($t_o$ is when the sample is first placed on the preheated plate); N=complex viscosity at time t>0; and a=0.294. Complex viscosity is calculated as $(N) = ([(G')^2 + (G'')^2]^{1/2})/w$.

A more detailed description of this test method is disclosed in *Journal Of Applied Polymer Science*, Vol. 42, 845–850 (1991).

Example 1

This example illustrates an embodiment of the present invention in which the catalyst deactivator contains acidic protons. The catalyst deactivator used was di(isooctyl) phosphite.

A 500-mL, three-necked flask was equipped with a 304 SS stirrer, a glass stopper for one of the sidenecks, a special glass head for the center neck through which the stirrer was inserted and argon gas was introduced, and a 12-inch vigreux column attached to the other sideneck of the flask, to dry ice traps and a source of vacuum. Into the flask were placed 130.00 grams (0.50 mole) of bis(methyl carbonate) derivative of 2,2,4,4-tetramethyl-1,3-cyclobutanediol (approximately 49 percent trans), and 0.0126 grams (approximately 50 ppm Na based on a theoretical polymer yield of 119 grams) of sodium formate.

The flask with its contents was evacuated to 0.5 torr and the vacuum was released to argon. This procedure was repeated two times. Under an argon atmosphere, the flask with its contents was partially immersed in a Belmont metal bath and stirred at 200° C. for one hour, two hours at 220° C., and one hour at 240° C. The amount of distillate was 27.60 grams. The polymer was colorless and has a very low melt viscosity.

The metal bath temperature was increased to 265° C. and held for 15 minutes. Over a period of 13 minutes, the pressure in the polymerization flask was reduced by vacuum to about 1.6 torr. The polymerization was continuously stirred for 30 minutes to obtain a high melt viscosity colorless polymer. The vacuum was released to argon and a 5.89 gram sample containing active catalyst residue was removed for analyses. This sample is referred to as "No Catalyst Deactivator" in Table 1.

To the remaining active mixture, 0.0707 grams (125 equivalent percent of the Na catalyst charged initially) of di(isooctyl) phosphite (DOVERPHOS-298®) was added. The mixture was stirred for 10 minutes under argon at 275° C. A 7.70 gram sample, "Catalyst Deactivator Added" sample, was removed. Then the metal bath temperature was increased to 285° C. and vacuum applied for 5 minutes. The mixture was stirred at 285° C. under 0.3 torr pressure for an additional 10 minutes. The vacuum was released to argon. The flask was cooled and the polymer was removed from the flask. The final product is referred to as "Catalyst Deactivator Added+Vac" in Table 1.

The "No Catalyst Deactivator," "Catalyst Deactivator Added," and "Catalyst Deactivator Added+Vac" samples were essentially colorless with IV's of 0.65, 0.64, and 0.62 dL/g, respectively. This indicates that the present process causes no addition of color. It also shows that the present process completely deactivates the catalyst since no significant change in IV occurred during the second vacuum application.

Thermal Gravimetric Analysis in nitrogen (TGA) for these three samples indicated that the temperatures at which the "No catalyst Deactivator," "Catalyst Deactivator Added," and "Catalyst Deactivator Added+Vac" samples lost 10% of their weight due to degradation were, 354° C., 387° C., and 388° C., respectively. This illustrates the excellent thermal stability of the polycarbonate after the deactivator was added, regardless of whether vacuum was applied a second time.

The degradation rate constants (DRC) for these three samples, as determined by the melt thermal stability test at 275° C. were $23.6 \times 10^{-5}$, $24.6 \times 10^{-5}$, and $11.6 \times 10^{-5}$, respectively. This shows that the process of the present invention improves the thermal stability of polycarbonates containing active alkali metal catalyst residues, especially when vacuum is applied after deactivation. These and other comparative data were shown in Table 1.

Example 2

This example illustrates the utility of the new catalyst-deactivating process of the invention when the catalyst deactivator was a trialkyl ester of phosphorous acid, WESTON-618® manufactured by, at a concentration of 3P/Na (3 phosphorus atoms per theoretical sodium atom).

This example also illustrates the utility of the present process with poly(2,2,4,4-tetramethyl-1,3-cyclobutylene carbonate) made by a different method than shown in Example 1. The poly(2,2,4,4-tetramethyl-1,3-cyclobutylene carbonate) was prepared by the reaction of the glycol with dimethyl carbonate.

A 500-mL, three-necked flask was equipped with a 304 SS stirrer, a glass stopper for one of the sidenecks, a special glass head for the center neck through which the metal stirrer was inserted and argon gas was introduced and a 12-in vigreux column attached to the other sideneck and to a distillation head. The distillation head was attached to dry ice traps and a source of vacuum.

Into the flask were placed 86.4 grams (0.60 mol) of 2,2,4,4-tetramethyl-1,3-cyclobutanediol (approximately 46.5% trans), and 280 mL (approximately 3.3 mol) of dimethyl carbonate. The system was flushed with argon. The flask contents were stirred to obtain a solution. Then, a very slow flow of argon was started through the system and maintained throughout the polymerization until the application of vacuum. The flask was then partly immersed in the Belmont metal bath and 30 mL of dimethyl carbonate were distilled over to dry the system. The flask was cooled slightly and 3 mL of a 0.1 N solution of $NaOCH_3$ in methanol was added as the catalyst. The flask was again heated to reflux. Over a period of 4 hrs, 174 mL were distilled over at a head temperature of 65°–90° C. and full takeoff. The excess volatiles were then distilled over by further immersing the flask into the metal bath.

The flask was then stirred with very slow argon flow at 200° C. for 1 hour, 220° C. for 1 hour, and 240° C. for one hour. A 58 mL distillate was collected. The vigreux column was then removed from the system, the distillation head was connected directly to one of the sidenecks of the flask, and the temperature of the metal bath was increased to 265° C. After 10 minutes, vacuum was applied to the flask and the pressure was reduced to "full vacuum" for 45 minutes.

The polymer was essentially colorless and has a moderately high melt viscosity. The vacuum was released to argon, and a 5.34 gram "No Catalyst Deactivator" sample was removed.

A deactivator of 0.3429 grams (3P/Na) of distearyl pentaerythritol diphosphite (WESTON-618®) was added and mixed into the polymer melt at 265° C. for 10 minutes. A 5.12 gram "Catalyst Deactivator Added" sample was removed for analyses. Vacuum (1.0 torr) was applied a second time (as in Example 1) to the mixture for 5 minutes. The mixture was stirred at 265° C. under 1.0 torr for an additional 10 minutes. The vacuum was released to argon. The flask was cooled and the polymer was removed from the flask. This is the "Catalyst Deactivator Added +Vacuum" sample shown in Table 1.

The results in Table 1 show the unexpected increase in thermal stability for a trialkyl ester phosphite.

Example 2a

This Example further illustrates the utility of the present catalyst-deactivating process using a higher concentration of the trialkyl ester, distearyl pentaerythritol diphosphite, WESTON-618®. Example 2 was repeated except the amount of catalyst solution used was 5 mL instead of 3 mL, and the catalyst deactivator was 0.9150 g (5P/Na) of WESTON-618®.

The "No Catalyst Deactivator," "Catalyst Deactivator Added," and "Catalyst Deactivator Added +Vacuum" samples were essentially colorless and had IV's of 0.58, 0.56, and 0.56 dL/g, respectively. The DRC's and TGA results for these samples shown in Table 1 show that the improvement in thermal stability was excellent. The results indicate that the process of the present invention, using a concentration of SP/Na triester phosphite as the deactivator caused no color and completely deactivated the catalyst of poly(2,2,4,4-tetramethyl-1,3-cyclobutylene carbonate) prepared from the reaction of dimethyl carbonate and 2,2,4,4-tetramethyl-1,3-cyclobutanediol, in the presence of a $NaOCH_3$ catalyst as in Example 2.

Example 2b

This Example further illustrates the utility of the present catalyst-deactivating process by using a lower concentration of the trialkyl ester, distearyl pentaerythritol diphosphite, WESTON-618®. Example 2 was repeated except the catalyst deactivator was 0.1143 g (1P/Na) of WESTON-618®.

The "No Catalyst Deactivator," "Catalyst Deactivator Added," and "Catalyst Deactivator Added+Vacuum" samples were essentially colorless and had IV's of 0.61, 0.58, and 0.70 dL/g, respectively. The increase in IV after final vacuum indicates that the catalysts was not completely deactivated. The DRC and TGA results in Table show that the thermal stability was improved, even though the catalyst was not completely deactivated.

Comparative Example 1

This Example illustrates that a phosphorus compound containing acidic protons, phosphoric acid ($H_3PO_4$), does not thermally stabilize poly(1,4-cyclohexylenedimethylene carbonate) prepared from 72% trans-1,4-cyclohexanedimethanol and dimethyl carbonate by the general process described in Example 2 for preparing poly(2,2,4,4-tetramethyl-1,3-cyclobutylene carbonate). This Example further illustrates that thermal stabilization of aliphatic polycarbonates by the addition of an acidic material is not generally useful.

A 500-mL, three-necked flask was equipped as in Example 2 and charged with 86.4 g (0.60 mol) 72% of trans 1,4-cyclohexanedimethanol and 320 mL (approx. 3.8 mol) of dimethyl carbonate were placed into the flask. The polymerization process was conducted essentially the same as in Example 2 except 6 mL of a 0.1 N solution of $NaOCH_3$ in methanol was added as the catalyst.

The high melt viscosity polymer was treated with the deactivation process of Example 2 except that 0.0288 grams (125 equivalent percent) of 85% aqueous $H_3PO_4$ was used as the deactivator. The "No Catalyst Deactivator," "Catalyst Deactivator Added" and "Catalyst Deactivator Added+ Vacuum" samples were slightly yellow tinted and had IV's of 0.88, 0.84, and 0.82 dL/g, respectively, which shows that deactivation was complete.

The DRC's were 435.8×10⁻⁵, 470.3×10⁻⁵, and 424.5×10⁻⁵, respectively. The results of thermogravimetric analyses (TGA) in $N_2$ which showed that the temperature at which 10% weight loss had occurred were, respectively, 352° C., 354° C., and 354° C. This illustrates the poor thermal stabilities of all three samples and that deactivation of the basic catalyst residues does not thermally stabilize poly(1,4-cyclohexanedimethylene carbonate).

Example 3

This Example illustrates the use of a phosphorus compound containing acidic protons, 85% aqueous $H_3PO_4$, as the catalyst deactivator at 125 equivalent percent of the basic catalyst residues in the process of the present invention using poly(2,2,4,4-tetramethyl-1,3-cyclobutylene carbonate) prepared from the glycol and dimethyl carbonate as in Example 2. The deactivation process was similar to Example 2. The results are shown in Table 1.

Example 3a

This Example is the same as Example 3 except 500 equivalent percent of the deactivator was used.

Example 4

This Example illustrates the ineffectiveness of a phosphorus compound outside of the scope of the present invention for thermally stabilizing poly(2,2,4,4-tetramethyl-1,3-cyclobutylene carbonate).

Example 2 was repeated except the amount of sodium methoxide catalyst solution used was 5 mL instead of 3 mL and 0.6519 grams (3P/Na) of tris(2-ethylhexyl)phosphate was added as the catalyst deactivator.

The "No Catalyst Killer," "Catalyst Killer Added" and "Catalyst Killer Added+Vac" samples were essentially colorless and had IV's of 0.61, 0.58, and 0.69 dL/g, respectively. The increase in IV indicates that the deactivation was not complete. The results shown in Table 1 indicate that no significant improvement of the thermal stability was achieved.

Example 5

This Example illustrates that a phosphonite, although not a preferred deactivator, has some utility as a catalyst deactivator in the present invention. The phosphonite used was SANDOSTAB P-3PQ®, manufactured by Sandoz Chemical Company, and shown above as Formula IIIb.

Example 2 was repeated except the amount of $NaOCH_3$ catalyst solution used was 5 mL instead of 3 mL and 0.7755 grams (3P/Na) of SANDOSTAB P-EPQ® was added as the catalyst deactivator. The results shown in Table 1 indicate complete deactivation with only a moderate improvement in thermal stability.

Example 6

This Example illustrate the use of a phosphorus compound containing acidic protons, 85% aqueous $H_3PO_4$, as the catalyst deactivator at a relatively low level (75 equivalent percent) in the process of the invention when the poly(2,2,4,4-tetramethyl-1,3-cyclobutylene carbonate) is prepared from the bis(methyl carbonate) derivative of 2,2,4,4-tetramethyl-1,3-cyclobutanediol.

Example 1 was repeated except the catalyst deactivator was 0.0054 grams (75 equivalent percent) 85% aqueous $H_3PO_4$. The data shown in Table 1 show that the deactivation was complete and that the thermal stability was effectively improved.

Example 6a

Example 6 was repeated except the concentration of $H_3PO_4$ was 125 equivalent percent instead of 75 equivalent percent. The results are shown in Table 1 and illustrate an effective process.

Example 6b

Example 6 was repeated except the concentration of $H_3PO_4$ was 200 equivalent percent. The results shown in Table 1 indicate complete deactivation and excellent thermal stability improvement. Comparison of Examples 6, 6a, and 6b shows that the thermal stability improved with higher concentrations of $H_3PO_4$.

Example 7

This example illustrates the use of another acidic phosphorus deactivator within the scope of the present invention, diisooctyl phosphite, at a relatively high concentration. Example 2 was repeated except 0.7650 grams (500 equivalent percent) of diisooctyl phosphite was used as the deactivator.

The data shown in Table 1 indicates that deactivation was complete, that the process caused no addition of color, and that the thermal stability of the polycarbonate was excellent after addition of the deactivator, regardless of whether vacuum was applied a second time.

Example 8

Example 2 was repeated, except 125 equivalent percent disodium hydrogen phosphate was used as the deactivator. Results are shown in Table 1. This example illustrates that some phosphorus compounds which contain acidic protons are not effective as catalyst deactivators in the process of the present invention.

Example 9

This example illustrates that sodium dihydrogen phosphate, although not a preferred catalyst deactivator, has some utility in the process of the present invention. Example 2 was repeated, except 125 equivalent percent sodium dihydrogen phosphate was used as the deactivator. The results are in Table 1.

Example 10

This example illustrates that phenyl phosphonic acid (formula IIIa, where R' is phenyl and R is H) has utility in the process of the present invention. Example 2 was repeated except the catalyst deactivator was 125 equivalent percent. The results are shown in Table 1.

Example 11

This example illustrates that a diaryl ester of phosphoric acid is effective in the process of the present invention. Example 2 was repeated except the catalyst deactivator was 125 equivalent percent diphenyl phosphate. The results are shown in Table 1.

Example 12

This example illustrates that a trialiphatic ester of $H_3PO_3$, trilauryl phosphite, has some utility in the process of the invention (especially if vacuum is applied after deactivation) when used at the relatively low concentration of 1 equivalent of phosphorus per equivalent of sodium catalyst residue (1 P/Na).

Example 2 was repeated except the catalyst deactivator was 0.1758 grams (1 P/Na) of trilauryl phosphite. The results are shown in Table 1.

Example 12a

This example illustrates that a trialiphatic ester of $H_3PO_3$, trilauryl phosphite, is effective as a catalyst deactivator in the process of the present invention when used at a concentration of three equivalents of phosphorus per equivalent of sodium catalyst residue.

Example 1 was repeated except the amount of sodium formate catalyst used was 0.0503 grams (200 ppm Na) and the catalyst deactivator was 1.300 grams of trilauryl phosphite (WESTON-TLP®). The results are shown in Table 1.

Examples 13–13a

These examples illustrate the utility of a triaryl ester of phosphorous acid, triphenyl phosphite, at one and three equivalents of phosphorus per equivalent of sodium catalyst residue. The results are shown in Table 1.

improves the TGA stability, has little effect on the degradation rate constants (DRC's) for the thermal stability test at 275° C., and gives substantial amber color in the polycarbonate.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Effect of Phosphorus-Containing and Phenolic Deactivators for Na Catalyst Residues in Poly(2,2,4,4-tetramethyl-1,3-cyclobutylene carbonate)

| | CATALYST DEACTIVATOR | | NO CATALYST DEACTIVATOR | | | | CATALYST DEACTIVATOR ADDED | | | | CATALYST DEACTIVATOR ADDED + VACUUM | | | |
|---|---|---|---|---|---|---|---|---|---|---|---|---|---|---|
| | | | | DRC | TGA | | | DRC | TGA | | | DRC | TGA | |
| Ex # | Deactivator | Conc. | IV | (× 10⁻⁵) | (° C.) | Color | IV | (× 10⁻⁵) | (° C.) | Color | IV | (× 10⁻⁵) | (° C.) | Color |
| 1 | Diisooctyl phosphite | 125 Eq % | 0.65 | 23.8 | 354 | none | 0.64 | 24.6 | 387 | none | 0.62 | 11.6 | 388 | none |
| 2 | WESTON 618 | 3P/Na | 0.73 | 16.0 | 348 | none | 0.73 | 11.3 | 382 | none | 0.70 | 7.2 | 382 | none |
| 2b | WESTON 618 | 1P/Na | 0.61 | 12.8 | 347 | none | 0.58 | 8.4 | 367 | none | 0.70 | 7.9 | 372 | none |
| 2a | WESTON 618 | 5P/Na | 0.58 | 36.4 | 344 | none | 0.56 | 18.9 | 379 | none | 0.56 | 19.6 | 373 | none |
| 3 | 85% H₃PO₄ | 125 Eq % | 0.65 | 32.6 | 346 | v. sl. yel. | 0.64 | 31.4 | 370 | v. sl. yel. | 0.63 | 19.0 | 383 | v. sl. yel |
| 3a | 85% H₃PO₄ | 500 Eq % | 0.60 | 33.9 | 348 | v. sl. yel. | 0.60 | 52.0 | 381 | v. sl. yel. | 0.59 | 54.3 | 389 | v. sl. yel |
| 4 | Tris(2-ethylhexyl)-phosphate | 3P/Na | 0.61 | 25.7 | 352 | none | 0.58 | 91.4 | 347 | none | 0.69 | 28.6 | 350 | none |
| 5 | SANDOSTAB P-EPQ | 3P/Na | 0.53 | 48.1 | 348 | none | 0.52 | 36.1 | 370 | sl. yel. | 0.53 | 31.9 | 373 | sl. yel. |
| 6 | 85% H₃PO₄ | 75 Eq % | 0.73 | 27.4 | 350 | none | 0.73 | 7.3 | 375 | none | 0.70 | 6.4 | 366 | none |
| 6a | 85% H₃PO₄ | 125 Eq % | 0.75 | 21.6 | 354 | none | 0.73 | 8.2 | 387 | none | 0.71 | 5.4 | 373 | none |
| 6b | 85% H₃PO₄ | 200 Eq % | 0.60 | 30.3 | 348 | none | 0.61 | 6.3 | 383 | none | 0.58 | 8.1 | 383 | none |
| 7 | Diisooctyl phosphite | 500 Eq % | 0.67 | 30.0 | 347 | v. sl. yel. | 0.63 | 40.3 | 376 | v. sl. yel. | 0.62 | 24.6 | 382 | v. sl. yel |
| 8 | Na₂HPO₄ | 125 Eq % | 0.64 | 19.8 | 345 | none | 0.62 | 24.1 | 342 | none | 0.65 | 13.5 | 343 | none |
| 9 | NaH₂PO₄ | 125 Eq % | 0.60 | 20.8 | 346 | none | 0.59 | 16.8 | 344 | none | 0.60 | 7.9 | 359 | none |
| 10 | ØP(O)(OH)₂ | 125 Eq % | 0.69 | 11.5 | 357 | none | 0.68 | 11.2 | 364 | none | 0.66 | 5.2 | 364 | none |
| 11 | Ø₂PO₄ | 125 Eq % | 0.65 | 11.5 | 352 | none | 0.64 | 11.2 | 388 | none | 0.64 | 5.3 | 383 | none |
| 12 | Trilauryl phosphite | 1P/Na | 0.53 | 14.7 | 352 | none | 0.52 | 14.6 | 361 | none | 0.53 | 7.8 | 355 | none |
| 12a | Trilauryl phosphite | 3P/Na | 0.78 | 12.2 | 343 | none | 0.75 | 20.6 | 379 | none | 0.74 | 3.6 | 377 | none |
| 13 | Triphenyl phosphite | 1P/Na | 0.52 | 12.7 | 354 | none | 0.50 | 24.2 | 363 | none | 0.52 | 10.4 | 360 | none |
| 13a | Triphenyl phosphite | 3P/Na | 0.55 | 10.1 | 352 | none | 0.50 | 9.9 | 367 | none | 0.55 | 13.9 | 370 | none |
| 14 | Triphenyl phosphate | 3P/Na | 0.76 | 9.0 | 344 | none | 0.71 | 22.6 | 380 | none | 0.68 | 8.7 | 379 | none |
| 15 | IRGANOX 1010 | 2OH/Na | 0.67 | 23.7 | 341 | none | 0.68 | 21.0 | 358 | Amber | 0.65 | 21.0 | 357 | Amber |

DRC = degradation rate constant, as determined by melt thermal stability test at 275° C.
TGA = thermal gravimetric analysis - temperature at which polymer had a 10% weight loss

Example 14

This example illustrates the utility of a triaryl ester of phosphoric acid, triphenyl phosphate, at three equivalents of phosphorus per equivalent of sodium catalyst residue.

Example 15

This example illustrates that a hindered phenolic (a somewhat acidic material), such as IRGANOX-1010® slightly

What is claimed:

1. A process of deactivating poly(2,2,4,4-tetramethyl-1,3-cyclobutylene carbonate), wherein the process comprises admixing the poly(2,2,4,4-tetramethyl-1,3-cyclobutylene carbonate) containing an active alkali metal catalyst residue with an effective amount of a deactivator represented by a formula selected from the group consisting of:

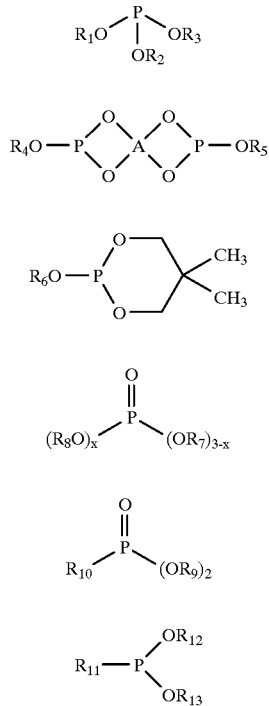

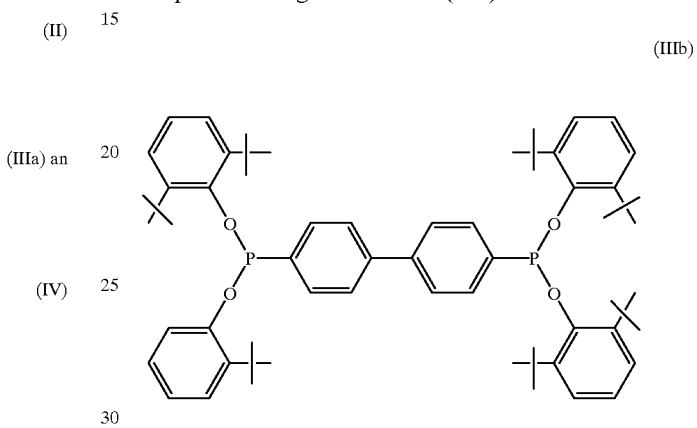

wherein,
- $R_1$–$R_7$ and $R_9$ are, independently, hydrogen; aliphatic hydrocarbon of from 1 to 20 carbon atoms; substituted aromatic hydrocarbon of from 6 to 20 carbon atoms; or unsubstituted aromatic hydrocarbon of from 6 to 20 carbon atoms;
- $R_8$ and $R_{10}$–$R_{13}$ are, independently, substituted or unsubstituted aromatic hydrocarbon of from 6 to 20 carbon atoms; or aliphatic hydrocarbon of from 1 to 20 carbon atoms;
- A is a tetrafunctional hydrocarbon group; and
- x is an integer of from 1 to 3, wherein the admixing is conducted at a temperature and time sufficient to deactivate the alkali metal catalyst to form a deactivated poly(2,2,4,4-tetramethyl-1,3-cyclobutylene carbonate), and wherein the deactivated catalyst is not removed from the deactivated poly(2,2,4,4-tetramethyl-1,3-cyclobutylene carbonate).

2. The process of claim 1, wherein the alkali metal catalyst comprises an alkali metal oxide, an alkali metal hydride, an alkali metal hydroxide, a free alkali metal, butyl lithium, phenyl lithium, sodium aluminate, an alkali metal alkoxide, or a combination thereof.

3. The process of claim 1, wherein the alkali metal catalyst comprises sodium methoxide, lithium methoxide, sodium metal, lithium metal, or a combination thereof.

4. The process of claim 1, wherein the deactivator is acidic.

5. The process of claim 4, wherein the deactivator comprises distearyl pentaerythritol diphosphite, di(isooctyl) phosphite, diphenyl phosphite, diphenyl phosphate, phosphorous acid, phosphoric acid, phenyl phosphonic acid, or a combination thereof.

6. The process of claim 4, wherein the deactivator is diphenyl phosphate.

7. The process of claim 1, wherein the deactivator is non-acidic.

8. The process of claim 7, wherein the deactivator is a trialiphatic triester of phosphorous acid or an aromatic ester of phosphorous acid.

9. The process of claim 8, wherein the trialiphatic ester is a compound having the formula (Ia), (Ib), or (Ic), wherein, $R_1$–$R_6$ are, independently, an aliphatic hydrocarbon of from 1 to 20 carbon atoms.

10. The process of claim 8, wherein the trialiphatic ester is trilauryl phosphite.

11. The process of claim 8, wherein the aromatic ester comprises triphenyl phosphite, tris(nonylphenyl)phosphite, or a combination thereof.

12. The process of claim 1, wherein the deactivator is a compound having the structure (IIIb)

13. The process of claim 4, wherein the amount of the deactivator is from about 75 to 1,000 equivalent percent.

14. The process of claim 4, wherein the amount of the deactivator is from about 75 to 500 equivalent percent.

15. The process of claim 4, wherein the amount of the deactivator is from about 75 to 200 equivalent percent.

16. The process of claim 4, wherein the amount of the deactivator is from about 75 to 175 equivalent percent.

17. The process of claim 4, wherein the amount of the deactivator is from about 100 to 125 equivalent percent.

18. The process of claim 7, wherein the deactivator is from about 1 to 10 phosphorus atoms per alkali metal atom, based on the amount of alkali metal catalyst added.

19. The process of claim 7, wherein the deactivator is from about 1 to 5 phosphorus atoms per alkali metal atom, based on the amount of alkali metal catalyst added.

20. The process of claim 8, wherein the deactivator is from about 2 to 4 phosphorus atoms per alkali metal atom, based on the amount of alkali metal catalyst added.

21. The process of claim 1, wherein during the deactivation step, the pressure is from atmospheric pressure to 1 torr.

22. The process of claim 1, wherein during the deactivation step, the pressure is from atmospheric pressure to 2 torr.

23. The process of claim 1, wherein during the deactivation step, the temperature is less than or equal to 300° C.

24. The process of claim 1, wherein during the deactivation step, the temperature is from 250 to 285° C.

25. The process of claim 1, further comprising, after the admixing step, applying a vacuum to the deactivated poly(2,2,4,4-tetramethyl-1,3-cyclobutylene carbonate).

26. The process of claim 1, wherein the polycarbonate is molten poly(2,2,4,4-tetramethyl-1,3-cyclobutylene carbonate).

27. The product made by the process of claim 1.

28. A process of deactivating poly(2,2,4,4-tetramethyl-1,3-cyclobutylene carbonate), wherein the process comprises:

(a) admixing
  i) a solid state poly(2,2,4,4-tetramethyl-1,3-cyclobutylene carbonate) comprising an active alkali metal catalyst; and
  ii) a deactivator of claim 1; and
(b) heating the admixture of step (a) at a temperature sufficient to melt the admixture and deactivate the alkali metal catalyst to produce a deactivated poly(2,2,4,4-tetramethyl-1,3-cyclobutylene carbonate), and wherein the deactivated catalyst is not removed from the deactivated poly(2,2,4,4-tetramethyl-1,3-cyclobutylene carbonate).

29. The process of claim 28, wherein the poly(2,2,4,4-tetramethyl-1,3-cyclobutylene carbonate) comprises a pellet or granule.

30. The product made by the process of claim 28.

31. A process of making a deactivated poly(2,2,4,4-tetramethyl-1,3-cyclobutylene carbonate), wherein the process comprises:
  (a) polymerizing poly(2,2,4,4-tetramethyl-1,3-cyclobutylene carbonate) in the presence of an alkali metal catalyst to produce an activated poly(2,2,4,4-tetramethyl-1,3-cyclobutylene carbonate); and
  (b) admixing the activated poly(2,2,4,4-tetramethyl-1,3-cyclobutylene carbonate) with an effective amount of a deactivator represented by a formula selected from the group consisting of:

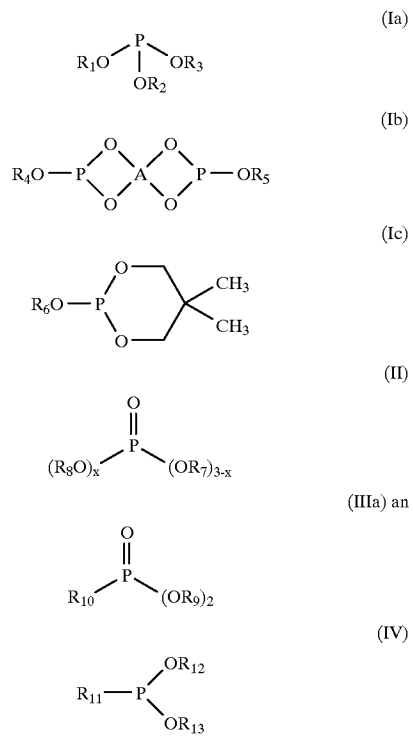

wherein,
  $R_1$–$R_7$ and $R_9$ are, independently, hydrogen; aliphatic hydrocarbon of from 1 to 20 carbon atoms; substituted aromatic hydrocarbon of from 6 to 20 carbon atoms; or unsubstituted aromatic hydrocarbon of from 6 to 20 carbon atoms;
  $R_8$ and $R_{10}$–$R_{13}$ are, independently, substituted or unsubstituted aromatic hydrocarbon of from 6 to 20 carbon atoms; or aliphatic hydrocarbon of from 1 to 20 carbon atoms;

A is a tetrafunctional hydrocarbon group; and
x is an integer of from 1 to 3,
at a temperature and time sufficient to deactivate the alkali metal catalyst to form a deactivated polycarbonate, wherein the deactivated catalyst is not removed from the deactivated polycarbonate.

32. The process of claim 31, wherein the polycarbonate is poly(2,2,4,4-tetramethyl-1,3-cyclobutylene carbonate).

33. The product made by the process of claim 31.

34. A poly(2,2,4,4-tetramethyl-1,3-cyclobutylene carbonate) composition comprising poly(2,2,4,4-tetramethyl-1,3-cyclobutylene carbonate) and a deactivated alkali metal catalyst, wherein the deactivated metal catalyst is a salt produced by the reaction between a deactivator and an alkali metal catalyst.

35. The poly(2,2,4,4-tetramethyl-1,3-cyclobutylene carbonate) composition of claim 34, wherein the poly(2,2,4,4-tetramethyl-1,3-cyclobutylene carbonate) has a degradation rate constant less than $10 \times 10^{-5}$.

36. A process of deactivating poly(2,2,4,4-tetramethyl-1,3-cyclobutylene carbonate), comprising admixing poly(2,2,4,4-tetramethyl-1,3-cyclobutylene carbonate) containing an active alkali metal catalyst residue with phosphorous compound at a temperature and time sufficient to deactivate the alkali metal catalyst to form a deactivated poly(2,2,4,4-tetramethyl-1,3-cyclobutylene carbonate), and wherein the deactivated catalyst is not removed from the deactivated poly(2,2,4,4-tetramethyl-1,3-cyclobutylene carbonate).

37. A process of deactivating poly(2,2,4,4-tetramethyl-1,3-cyclobutylene carbonate), wherein the process consists esentially admixing the poly(2,2,4,4-tetramethyl-1,3-cyclobutylene carbonate) containing an active alkali metal catalyst residue with an effective amount of a deactivator represented by a formula selected from the group consisting of:

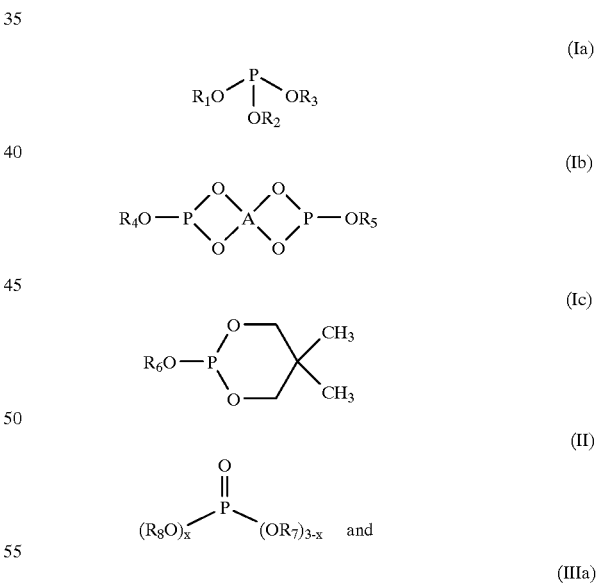

wherein,
  $R_1$–$R_7$ and $R_9$ are, independently, hydrogen; aliphatic hydrocarbon of from 1 to 20 carbon atoms; substituted aromatic hydrocarbon of from 6 to 20 carbon atoms; or unsubstituted aromatic hydrocarbon of from 6 to 20 carbon atoms;

$R_8$ and $R_{10}$–$R_{13}$ are, independently, substituted or unsubstituted aromatic hydrocarbon of from 6 to 20 carbon atoms; or aliphatic hydrocarbon of from 1 to 20 carbon atoms;

A is a tetrafunctional hydrocarbon group; and x is an integer of from 1 to 3, wherein the admixing is conducted at a temperature and time sufficient to deactivate the alkali metal catalyst to form a deactivated poly(2,2,4,4-tetramethyl-1,3-cyclobutylene carbonate), and wherein the deactivated catalyst is not removed from the deactivated poly(2,2,4,4-tetramethyl-1,3-cyclobutylene carbonate).

* * * * *